J. HOPKINSON.
SCALE.
APPLICATION FILED MAR. 2, 1916.

1,248,862.

Patented Dec. 4, 1917.

WITNESSES:
P. Leonard
Felix Thomas

INVENTOR.
Joseph Hopkinson
BY Kerr Page Cooper + Hayward
ATTORNEYS

UNITED STATES PATENT OFFICE.

JOSEPH HOPKINSON, OF DAYTON, OHIO.

SCALE.

1,248,862.  Specification of Letters Patent.  Patented Dec. 4, 1917.

Application filed March 2, 1916. Serial No. 81,602.

*To all whom it may concern:*

Be it known that I, JOSEPH HOPKINSON, residing at Dayton, Montgomery county, Ohio, have invented certain new and useful Improvements in Scales, of which the following is a full, clear, and exact description.

This invention relates to certain new and useful improvements in computing scales of the type shown in the patent to Hopkinson and Ozias, No. 867,671. This improvement relates to an improved lever system; to improvements in the location of the main scale beam; and to improvements in the connecting devices between the base lever system and the main beam and indicating hand.

In the drawings Figure 1 shows an assembly view of the scale.

Figure 1:
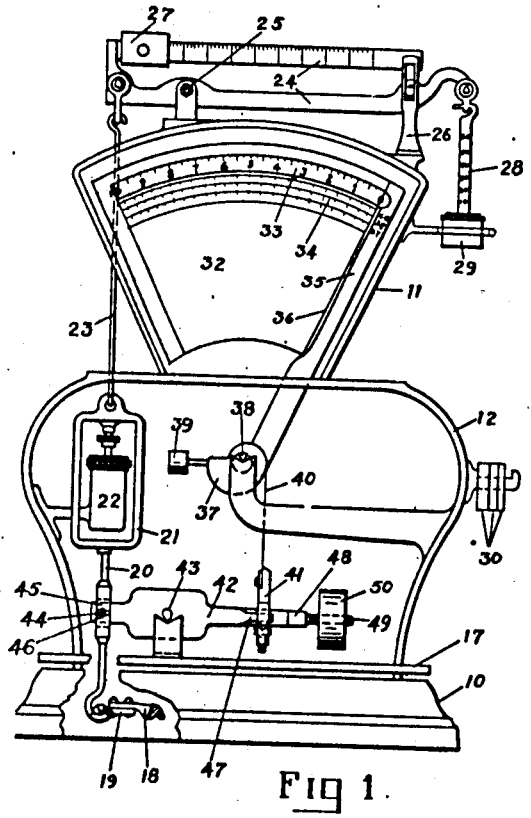

In Fig. 1, 10 is the base of the scale and 11 the chart housing connected by a frame 12. Within the base 10 are a number of compound levers 13—14. The arrangement of these levers may be modified in various ways as will occur to those skilled in the art. A platform skeleton 15 is provided with depending feet 16 which rest on knife edges on the levers and thereby support the platform 17. One of the compound levers has a portion 18 which extends diagonally in the base (as shown in Fig. 1) and carries on its end a nose iron 19 having a downwardly pointing knife edge. A link 20 is provided with a hooked portion at its lower end which engages the aforesaid knife edge. The upper end of the link is bifurcated or looped at 21 to surround a dash pot 22, suitably supported by frame 12. The plunger of this dash pot is connected to the upper side of the loop 21. Attached to the loop 21 is a vertically extending steelyard 23 which is suitably connected at the upper end by loop and knife edge connections to main scale beams 24, fulcrumed at 25. These beams are supported upon the top of the fan housing and are guided in their movement by a pin which extends through a slot in a bracket 26. The upper beam 24 is graduated and provided with a sliding poise 27. Both beams may be graduated if desired or the location of the beams may be changed. The location of the beams upon the top of the housing, however, is preferable in that it permits a customer at the opposite side of the scale to see the location of poise 27. In order that the customer may know the weight balanced by the poise the opposite side of the upper beam is graduated. This beam may be utilized for taking out tare or increasing the capacity of the scale.

Attached to the end of the main scale beam by suitable knife edge and loop connections is a shot cup stem 28 carrying a depending shot cup 29. This shot cup aids in counterbalancing the weight of the base levers, platforms, and connecting links and aids in maintaining the system in equilibrium when there is no load upon the platform. Additional weights 30 may be added to the shot cup stem to increase the capacity of the scale. The shot cup stem is graduated as shown so that the weight counterbalanced by additional weights can be quickly ascertained.

Figure 3:
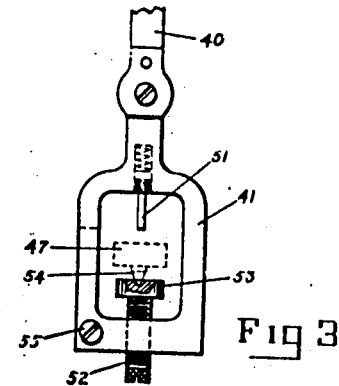
Fig. 3 is a detail view of the connecting stirrup.
Figure 4:
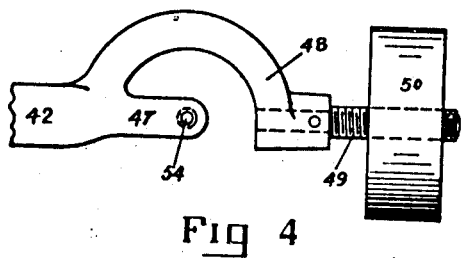
Fig. 4 is a detail plan view of the intermediate lever.
Figure 2:
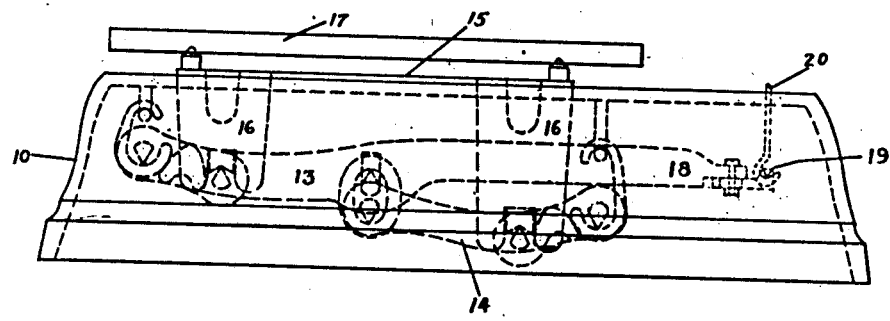
Fig. 2 shows a side view of the base and the lever system therein.

The chart housing 11 carries a fan shaped computing chart 32 having weight and price per weight graduations as 33 and 34. Arranged to swing over the computing chart is an indicating hand 35 with price per pound markings thereon. The indicating hand carries the usual indicating wire 36. The lower end of the indicating hand is attached to an eccentric cam 37. This cam is supported by knife edge pivots 38 which bear in V block bearings carried by brackets which extend from frame 12. The eccentric cam has secured to it a pendulum weight 39 and also has secured thereto a flexible tape 40 which extends over the eccentric portion of the cam and downwardly to a stirrup 41. The stirrup 41 connects the flexible tape 40 with an intermediate lever 42, which lever is of the first order of leverage. This intermediate lever is disposed parallel with and below the chart and directly below the eccentric cam and is provided with supporting knife edge pivots 43 which bear on V block bearings as shown in Fig. 1. The intermediate lever on the opposite side of the fulcrum carries an upwardly and downwardly pointing knife edge 44 which engages upper and lower V block bearings 45 and 46. These bearings are carried by link 20. The intermediate lever is weighted at the center adjacent the fulcrum so that the knife edges 43 always remain in contact with their V bearings. The opposite end is bifurcated as clearly shown in Fig. 4. One bifurcation 47 receives stirrup 41 and the other bifurcation 48 bends around to provide proper clearance for the stirrup. The portion 48 of the lever carries a threaded stud 49. A counterweight 50 engages the treads of this stud and is adapted to normally maintain the intermediate lever in the position shown. By reason of the threaded stud the counterbalancing effect of counterweight 50 can be decreased or increased as desired. The stirrup 41 as shown in Fig. 3 receives the bifurcated portion 47 of the intermediate lever and is provided with a spring pressed plunger 51 which bears against the top of portion 47. The lower loop of the stirrup is threaded to receive a bearing stud 52 which is conically cupped at the upper end at 53 to receive a conical bearing 54 which is carried by portion 47 of the intermediate lever. One side of the stirrup 41 is split and provided with a lock screw 55. When it is desired to adjust the stirrup connection set screw 55 is loosened and thereafter 52 is screwed up or down. The plunger 51 at all times prevents the conical bearing 54 from escaping from the cup 53. When the adjustment is completed, set screw 55 is tightened thus holding 52 in proper position. The spring pressed plunger 51 permits the disconnection of the stirrup and the intermediate lever without destroying the previous adjustments.

Operation.

When there is no load on the scale pendulum 39 is in elevated position, being maintained in such position by the weight of counterbalance 50. When a load is placed upon the platform the compound levers in the base of the scale are depressed thus lowering nose iron 19 and link 20. Bearing 45 presses against knife edge 44 and rocks intermediate lever 42 (a lever of the first order) counterclockwise, thereby elevating counterweight 50 and slacking off on flexible tape 40. The pendulum 39 then descends and swings the indicating hand 35 over the chart to an extent proportional to the weight on the platform.

As previously explained, if the weight on the scale platform exceeds the capacity of the chart, the poise 27 and the weights 30 may be employed to increase the capacity. The dash pot 22 serves to reduce and dampen the vibrations of the levers and associated elements and cause the indicating hand to come quickly to rest.

It will be understood that my invention is not limited to the precise construction shown and described, but may be modified in various ways as will occur to those skilled in the art.

What I claim as my invention is more particularly pointed out in the appended claims:

1. In a scale, in combination, a platform, a compound lever system in the base of the scale supporting the aforesaid platform, one of said compound levers extending diagonally in the base of the scale and carrying a nose iron; a chart housing above the platform; a computing chart therein; an intermediate lever intermediate the platform and the chart and extending parallel with the chart; an indicating hand adapted to swing over the chart; a pendulum to balance the load as the indicating hand moves over the chart; a main scale beam having a sliding poise thereon mounted upon the top of the chart housing, whereby the location of the poise thereon may be seen from both sides of the scale; a connecting member intermediate the scale beam and the nose iron, said connecting member having means associated therewith to move the intermediate lever in unison therewith; and flexible connections intermediate the pendulum and indicating hand and the aforesaid intermediate lever, whereby when the compound lever system is depressed by a load on the scale the indicating hand moves over the chart to an extent proportional to the load on the scale platform.

2. In a scale, in combination with the usual compound lever system in the base of the scale; a nose iron connected with and extending diagonally from one of the aforesaid compound levers; an intermediate lever of the first order above the said nose iron; a main scale beam having a sliding poise thereon; connections intermediate the main scale beam, the nose iron, and the intermediate lever; a counterbalancing weight on said intermediate lever on the opposite side of the fulcrum from the connection to the nose iron; a computing chart; an indicating hand moving thereover, a normally raised pendulum connected with the said indicating hand; an eccentric cam and flexible connections in operative association with the said cam and the weighted end of the intermediate lever for moving the indicating hand over the chart upon a load being placed on the scale.

3. In a scale in combination with a compound lever system in the base of the scale, a nose iron secured to a diagonal extension from one of the aforesaid compound levers, a main scale beam having a sliding poise thereon, connections intermediate said main scale beam and the nose iron, an intermediate lever connected with and moved by the aforesaid connection, a weight and price chart, an indicating hand moving thereover, a pendulum connected therewith, said intermediate lever having provisions for maintaining the pendulum in normal elevated position and descending as a load is applied to the scale, and connections from the aforesaid pendulum to the intermediate lever whereby when a load is placed on the scale the rocking of the intermediate lever swings the indicating hand over the chart proportionally to the weight on the platform.

4. In a scale in combination with a compound lever system in the base of scale, a nose iron secured to a diagonal extension from one of the aforesaid compound levers, a main scale beam having a sliding poise thereon, connections intermediate the main scale beam and nose iron, an intermediate lever of the first order having one end operatively connected with the aforesaid connections, a computing chart, an indicating hand adapted to move thereover, a normally raised pendulum, a flexible connection intermediate the pendulum and the intermediate lever on the opposite side of the fulcrum from the first mentioned connection, and counterbalancing means associated with said intermediate lever adapted to depress one end of the intermediate lever and maintain the pendulum in elevated position when there is no load on the scale.

5. In a scale in combination with the usual levers supporting the platform of the scale, an intermediate lever of the first order connected with the aforesaid supporting lever system, a bifurcated portion on the opposite end of the aforesaid lever, an adjustable counterbalancing weight upon one of the aforesaid bifurcations, a stirrup upon the other bifurcation, a flexible tape connected with the stirrup, an eccentric cam and a pendulum connected with the aforesaid tape, an indicating hand connected with the cam, said pendulum being normally held in raised position and adapted to descend as a load is placed upon the scale and thereby control the extent of movement of the indicating hand.

6. In a scale, in combination, a lever, a stirrup having a spring pressed plunger adjacent one side of the said lever, a conical bearing extending from the underside of the said lever, an adjustable bearing having a conical depression to receive the aforesaid conical bearing and clamping means to lock the aforesaid adjustable bearing in set position.

7. In a scale, in combination, with the usual lever system supporting the platform of the scale, an intermediate lever of the first order having connections extending to the said supporting lever system, a chart housing above the base, a main scale beam having a sliding poise thereon fulcrumed on the top of the chart housing whereby the poise is visible from both sides of the scale, a chart in said housing, an indicating hand adapted to swing over the chart, a pendulum operatively connected therewith, connections intermediate the intermediate lever and the pendulum to maintain the pendulum in normal raised position, and connections intermediate the intermediate lever and the main scale beam, to cause the main scale beam to be moved in unison with the intermediate lever.

8. In a scale, in combination, with the usual lever system supporting the platform of the scale; an intermediate lever of the first order having connections extending to said supporting lever system; a chart housing above the base; a main scale beam having a sliding poise thereon, fulcrumed on the top of the chart housing, whereby the poise is visible from both sides of the scale; a connection from said beam to the intermediate lever; a pendent member on the end of the scale beam to which weights may be added for increasing the capacity of the scale; a chart in the said housing; an indicating hand movable thereover; a pendulum associated with the indicating hand; and connections intermediate the intermediate lever and the pendulum to maintain the latter in normally raised position, said connections being adapted to cause the pendulum and indicating hand to move proportionally upon a load being applied to the scale platform.

9. In a scale, in combination with the base lever system to support the platform; an intermediate lever of the first order, having a counterweight on one end thereof; connections intermediate the base lever system and the intermediate lever; a computing chart; an indicating hand adapted to swing over the said chart; a pendulum adapted to balance the load as the indicating hand moves over the chart, and connections intermediate the pendulum and the aforesaid intermediate lever, whereby the pendulum is normally maintained in elevated position and whereby when a load is applied to the scale the pendulum descends and moves the indicating hand over the chart proportionally to a load on the platform.

10. In a scale, in combination with the usual lever system in the base of the scale; a main scale beam having a sliding poise thereon; an intermediate lever of the first order having one end operatively connected with the lever system in the base of the scale; connections intermediate the said lever system and the main scale beam; a computing chart; an indicating hand adapted to move thereover; a normally raised pendulum; and connections intermediate the pendulum and the intermediate lever, whereby upon the application of a load to the scale the movement of the intermediate lever permits the pendulum to descend to a proportionate extent and move the indicating hand over the chart to a corresponding extent.

11. In a scale, in combination with the usual lever system supporting the platform of the scale; an intermediate lever of the first order having connections extending to the aforesaid supporting lever system; a counterbalance carried by the said intermediate lever on the opposite side of the fulcrum from the connection to the lever system; a flexible tape suitably connected with the said intermediate lever adjacent the counterbalance; an eccentric cam and a pendulum connected with the aforesaid tape; an indicating hand connected with the pendulum, said pendulum being normally held in raised position by the counterbalanced intermediate lever and adapted to descend as a load is placed on the scale and thereby control the extent of movement of the indicating hand.

In testimony whereof I affix my signature in the presence of two subscribing witnesses.

JOSEPH HOPKINSON.

Witnesses:
H. M. WALSH,
F. G. SHERMAN.